(12) United States Patent
Kim

(10) Patent No.: US 7,302,263 B2
(45) Date of Patent: Nov. 27, 2007

(54) HANDOVER IN A MOBILE COMMUNICATION SYSTEM

(75) Inventor: Young-Jun Kim, Kyungki-Do (KR)

(73) Assignee: LG-Nortel Communications, Ltd., Seoul (KR)

( * ) Notice: Subject to any disclaimer, the term of this patent is extended or adjusted under 35 U.S.C. 154(b) by 258 days.

(21) Appl. No.: 10/233,489

(22) Filed: Sep. 4, 2002

(65) Prior Publication Data

US 2003/0045292 A1    Mar. 6, 2003

(30) Foreign Application Priority Data

Sep. 5, 2001    (KR)    ................................ 2001-54468

(51) Int. Cl.
    *H04Q 7/20*    (2006.01)
(52) U.S. Cl. ...................... 455/436; 370/332; 370/333; 455/423; 455/67.11
(58) Field of Classification Search ............. 455/422.1, 455/444, 423, 438, 424, 442, 425, 437, 500, 455/67.11, 513, 550.1, 436; 370/333, 332
    See application file for complete search history.

(56) References Cited

U.S. PATENT DOCUMENTS

| | | | | |
|---|---|---|---|---|
| 5,483,668 A | * | 1/1996 | Malkamaki et al. | 455/442 |
| 5,499,386 A | * | 3/1996 | Karlsson | 455/444 |
| 5,577,047 A | * | 11/1996 | Persson et al. | 370/333 |
| 6,041,235 A | * | 3/2000 | Aalto | 455/437 |
| 6,512,925 B1 | * | 1/2003 | Chen et al. | 455/442 |
| 6,728,228 B1 | * | 4/2004 | Ostman et al. | 370/332 |
| 6,826,402 B1 | * | 11/2004 | Tran | 455/438 |
| 7,054,631 B2 | * | 5/2006 | Tee | 455/436 |
| 2002/0090938 A1 | * | 7/2002 | Dharia et al. | 455/422 |
| 2003/0013447 A1 | * | 1/2003 | Persson et al. | 455/437 |

* cited by examiner

*Primary Examiner*—Joy K. Contee
(74) *Attorney, Agent, or Firm*—KED & Associates, LLP

(57) ABSTRACT

A method and apparatus for handing over a radio signal to a mobile device from at least two base stations. The mobile device will only qualify a radio signal, if it is above a predetermined threshold. Accordingly, the quality of the output of the mobile device is preserved.

19 Claims, 8 Drawing Sheets

FIG. 5

| INTRA-FREQUENCY MEASUREMENT SYSTEM INFORMATION | REFERENCE FOR DETERMINING CELL HAVING THE SAME FREQUENCY |
|---|---|
| > REPORTING INFORMATION FOR STATE CELL_DCH | REFERENCE FOR DETERMINING HANDOVER WHEN USER EQUIPMENT IS BUSY |
| >> INTRA-FREQUENCY MEASUREMENT REPORTING CRITERIA | PARAMETER DEFINITION FOR EACH EVENT |
| >>> REPORTING RANGE | RANGE ON THE BASIS OF THE BEST CELL AMONG CELLS FOR WHICH A CALL HAS BEEN ESTABLISHED |
| >>> HYSTERESIS | CORRECTION VALUE USED FOR EVENT |
| >>> TIME TO TRIGGER | TIME DIFFERENT BETWEEN EVENT OCCURRENCE AND ITS REPORTING |

FIG. 8

| INTRA-FREQUENCY MEASUREMENT SYSTEM INFORMATION | REFERENCE FOR DETERMINING CELL HAVING THE SAME FREQUENCY |
|---|---|
| > REPORTING INFORMATION FOR STATE CELL_DCH | REFERENCE FOR DETERMINING HANDOVER WHEN USER EQUIPMENT IS BUSY |
| >> INTRA-FREQUENCY MEASUREMENT REPORTING CRITERIA | PARAMETER DEFINITION FOR EACH EVENT |
| >>> WORST THRESHOLD | WORST ABSOLUTE THRESHOLD |
| >>> HYSTERESIS 1A | CORRECTION VALUE FOR CELL ADDITION |
| >>> HYSTERESIS 1B | COLLECTION VALUE FOR CELL DELETION |
| >>> HYSTERESIS 1C | COLLECTION VALUE FOR CELL REPLACEMENT |
| >>> $\Delta T_1$ | TIME DIFFERENCE BETWEEN A CELL ADDITION / REPLACEMENT EVENT OCCURRENCE AND ITS REPORTING |
| >>> $\Delta T_2$ | TIME DIFFERENCE BETWEEN A CELL DELETION EVENT OCCURRENCE AND ITS REPORTING |

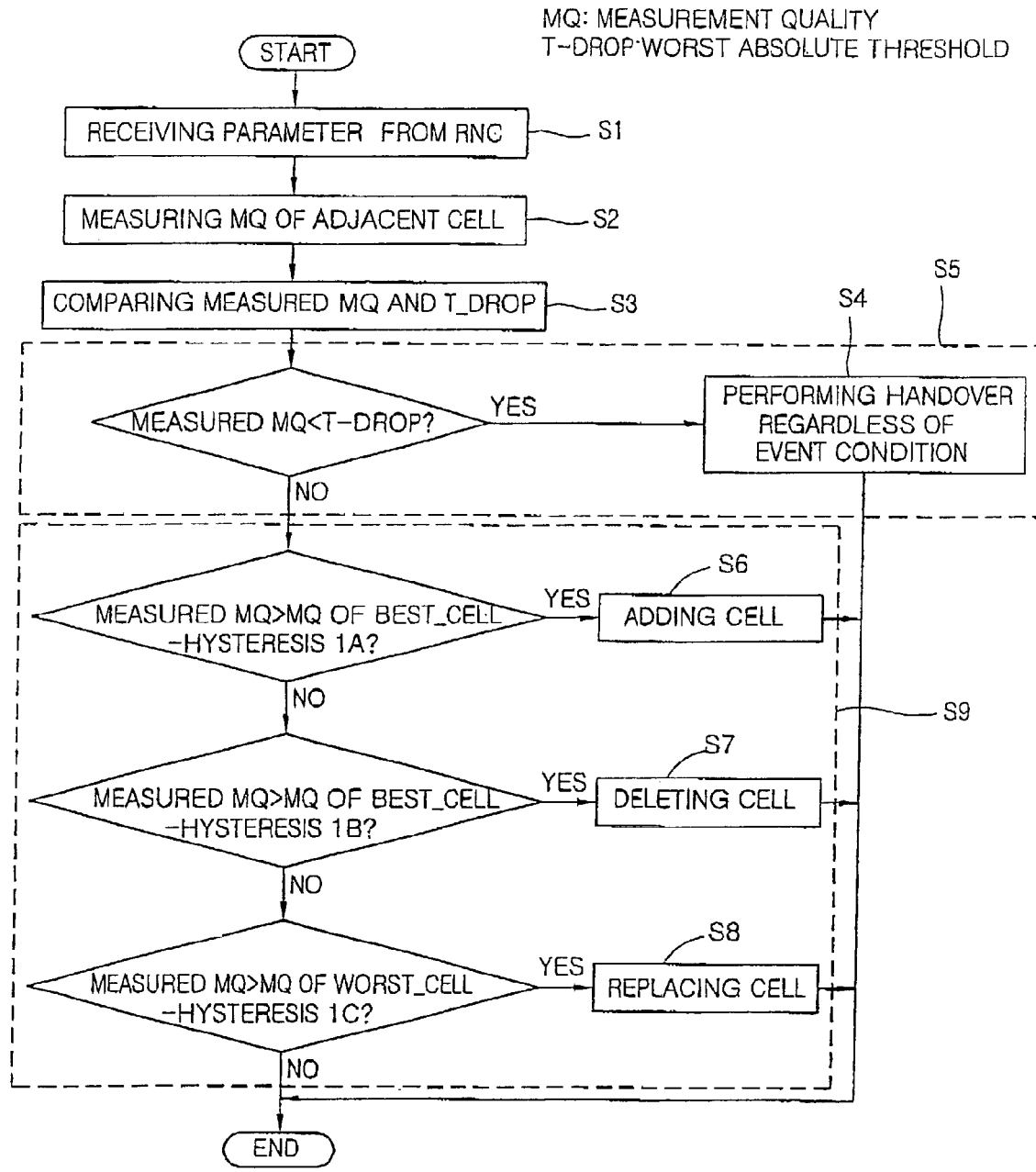

HANDOVER IN A MOBILE COMMUNICATION SYSTEM

BACKGROUND OF THE INVENTION

1. Field of the Invention

The present invention generally relates to a handover in a mobile communication system.

2. Background of the Related Art

Mobile radio communication systems are used in everyday life. Garage door openers, remote controllers for home entertainment equipment, cordless telephones, hand-held walkie-talkies, pagers, and cellular telephones are all examples of mobile radio communication systems. Cellular radio systems provide high quality service that is often comparable to that of landline telephone system.

A cellular radio system may include cell phones and base stations. Cell phones are portable telephones which end users may use to make telephone calls. The base stations communicate with the cell phones using radio signals. Base station may be stationary and have relatively large antennas. As a user with a cell phone travels, the user is most likely moving away or getting closer to the base station with which the cell phone is communicating. As the cell phone is moved away from the base station, the radio signal between the cell phone and the base station becomes weaker. Eventually, the radio signal will become so weak that the cell phone and the base station are not able communicate. When the radio signal becomes too weak for communication to occur, the cell phone starts to communicate with another base station that is closer to the cell phone. The closer base station will provide a stronger signal than the further away base station. This switching of base station is often referred to as a handoff (much like the handing off of a baton by a relay runner in the Olympics).

Unfortunately, a handoff may result in a degraded radio signal between a base station and a cell phone. When such a degraded radio signal occurs, it can be very annoying for the user of the cell phone. For instance, if the user of the cell phone is conducting a telephone conversation when the radio signal is degraded, the sound coming out of the cell phone may include an overwhelming amount of static. Accordingly, there is a long felt need to minimize degraded radio signals that occur as a result of a handoff.

SUMMARY OF THE INVENTION

The object of the present invention is to at least overcome the disadvantages discussed above. In general, the present invention relates to a method that only utilizes a radio signal if the signal strength of the radio signal is greater than a predetermined level.

Embodiments of the present invention relate to a method including the following steps. Monitoring the signal strength of a first signal received from a first base station. Monitoring the signal strength of a second signal received from a second base station. Utilizing the first signal. Utilizing the second signal if the signal strength of the second signal is greater than a predetermined level. The information embodied in the first signal and the information embodied in the second signal are substantially the same. The signal strength of the first signal is greater than the signal strength of the second signal.

For example, when the cell phone is in communication range of a first base station and a second base station, the cell phone will actually use both base stations for communication. In cellular telephone systems, both base stations will transmit the same signal. Accordingly, a cell phone will receive substantially the same signal from both the first base station and the second base station. If a cell phone is using two base stations and the user of the cell phone is conducting a conversation, the signals received from the two base stations are output at the same time from the cell phone. Since the signals received from the two base stations are the same, the sounds output from the cellular phone do not conflict and the user does not notice that they are listening to two signals. However, if one of the signals received at the cell phone is degraded and the other is not, the user will notice static sound output from the cell phone. The embodiments of the present invention prevent the static by preventing the degraded signal from being output on the cell phone. Accordingly, the cell phone will only output the radio signal that is not degraded.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

FIG. 5 is a view illustrating a handover parameter table of an SIB message according to an exemplary 3GPP specification.

FIG. 8 is an exemplary handover parameter table of an SIB message.

FIG. 9 is a flow chart of an exemplary handover determining method.

DETAILED DESCRIPTION OF PREFERRED EMBODIMENTS

A handover is a movement of a mobile station from one base station to an adjacent base station. The handover occurs when a signal in the former base station becomes weak. When a mobile station becomes physically distant from a base station, the strength of a signal is naturally weakened. Thus, in order to continuously receive a service, the mobile station starts to receive the signal from the adjacent base station, wherein the adjacent base station receives a stronger radio wave than the former base station.

Handover may be classified into a hard handover and a soft handover. The hard handover is a movement to a different base station after a mobile station completely disconnects a call sound. The soft handover performs a handover without disconnecting a call sound by simultaneously connecting a speech path between both base stations. The soft handover may have three types of events. These events are cell addition, cell deletion and cell replacement. An example of a communication system that may utilize the present invention is IMT-2000 of DS-MAP.

Figure 1:
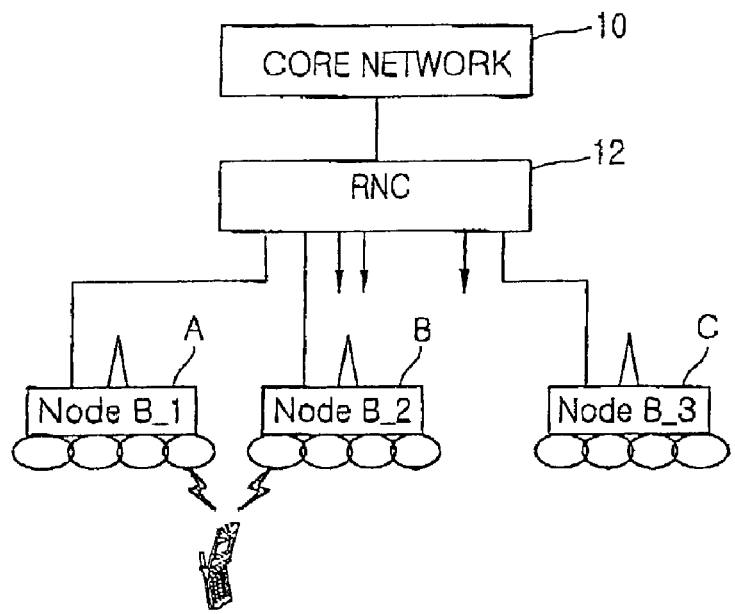
FIG. 1 is a drawing illustrating a general system of IMT-2000.
Figure 2:
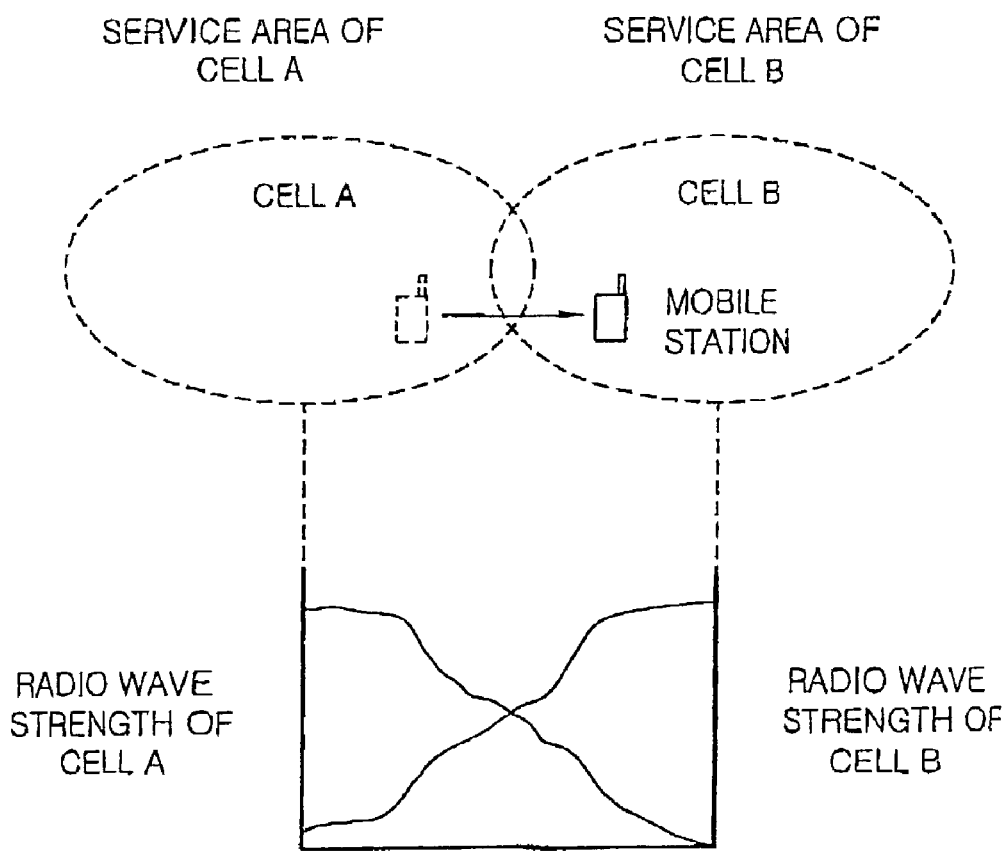
FIG. 2 is an exemplary conceptual view of a handover.

FIG. 1 illustrates the construction of an IMT-2000 system and FIG. 2 is an exemplary conceptual view of a handover. Radio network controller (RNC) (12) of the IMT-2000 system controls a plurality of base stations (A, B and C). Each base station consists of a plurality of cells. A handover takes place when the mobile station is located or travels in an overlapped area between cells. In other words, when the mobile station is located in the overlapped area between an existing cell region and a new cell region, a mobile communication system performs a handover with reference to a measurement quantity and parameter values for the new cell.

FIG. 5 illustrates an exemplary handover parameter table of an SIB message according to the 3GPP (3rd Generation Partnership Project) specification. Upon determining the handover, the RNC (12) carries required information on a system information block 11 (SIB11) type message and transmits it to the mobile station. The SIB11 is a type of an RNC message transmitting handover-related information.

Figure 3:
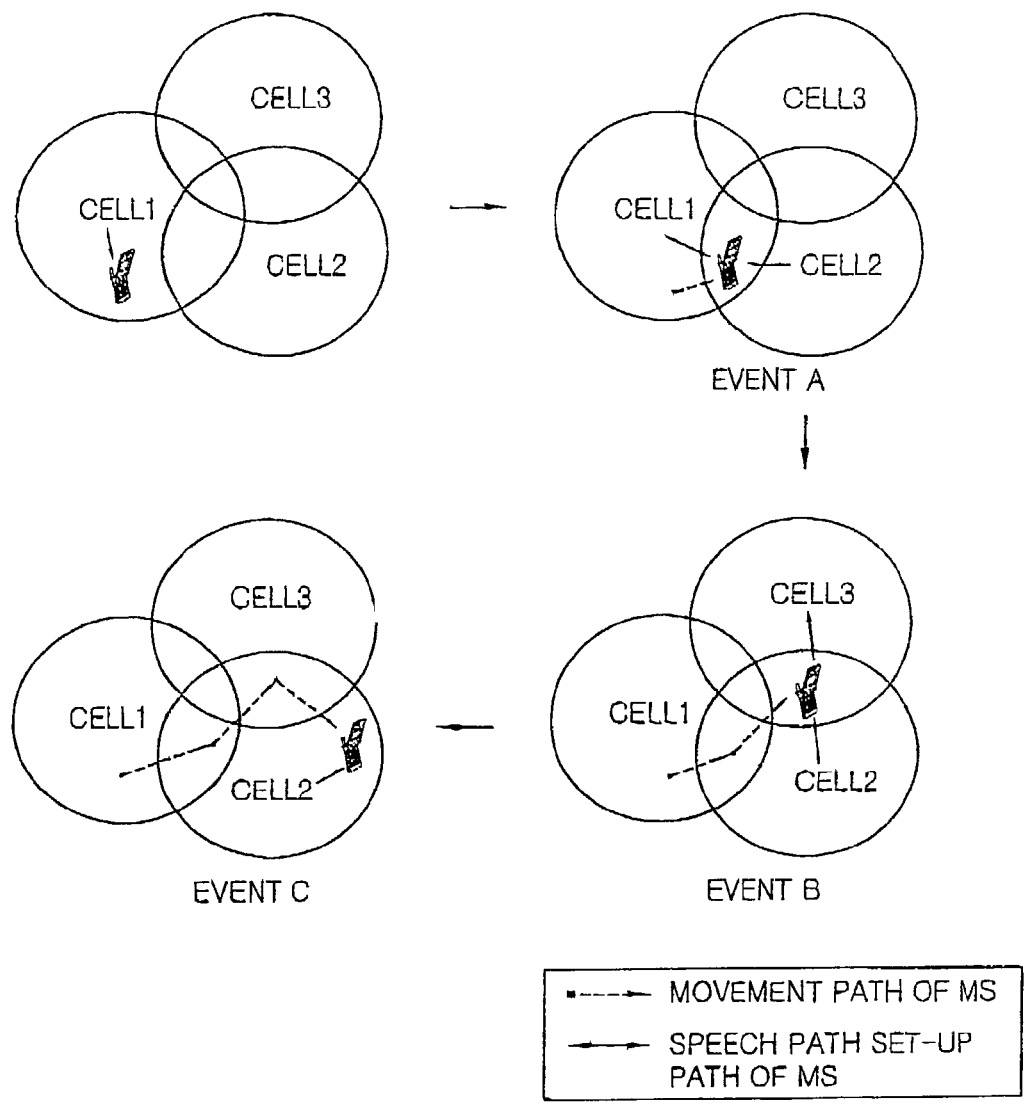
FIG. 3 is a drawing illustrating a set-up of a speech path between a cell and a terminal.
Figure 4:
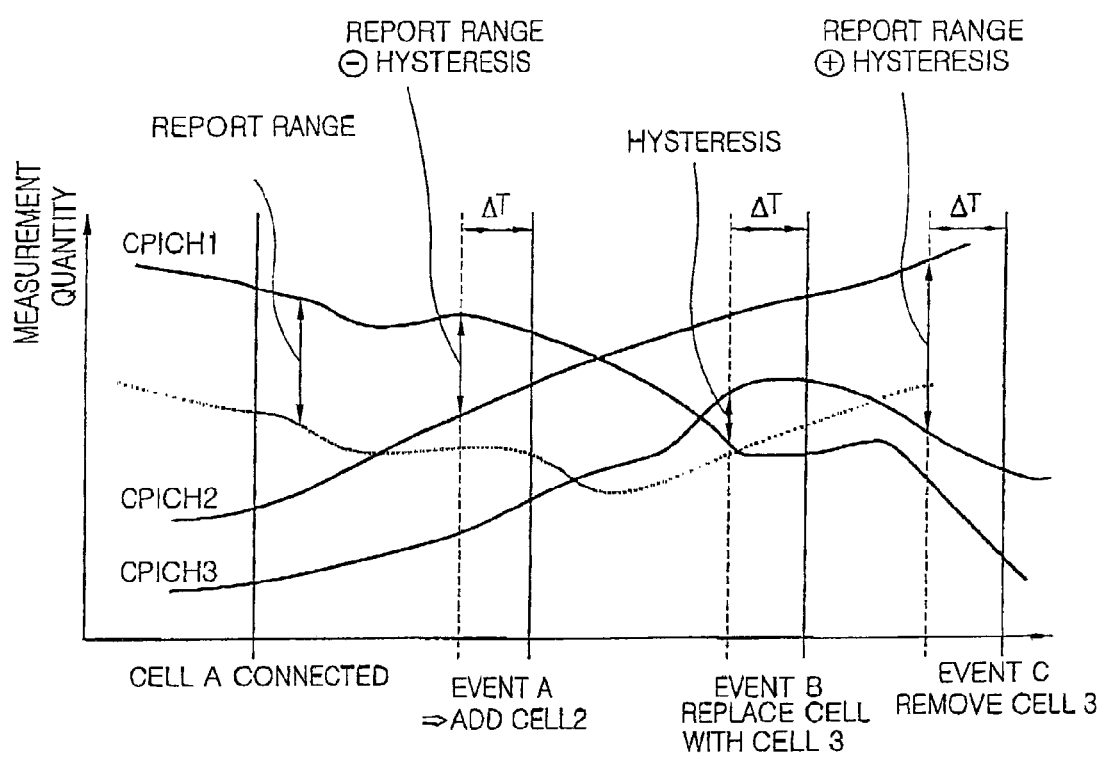
FIG. 4 is a graph of an event condition.

FIG. 3 is an exemplary view showing events of the soft handover and FIG. 4 is an exemplary event condition graph. An exemplary soft handover determining method is illustrated with reference to FIGS. 1, 3 and 4. At an early stage of establishing a speech path, the RNC (12) carries certain parameters (i.e., reporting range, a hysteresis, a time trigger (T), etc.) on the SIB11 and transmits them to the mobile station. When the mobile station is located in an overlapped area between a cell region to which it belongs and a new cell region, the mobile station starts measuring a measurement quantity. And the mobile station determines which handover event (cell addition, cell deletion, or cell replacement) is to be performed for the newly overlapped cell region by using the 'report range' and the 'hysteresis'. The mobile station determines a handover on the basis of a cell with the best measurement quantity (Best_Cell) and a cell with the worst measurement quantity (Worst_Cell). The report range is a correction value used when an event occurs. The Best_Cell is a cell with the best measurement quantity among cells to which a speech path has been set up with a terminal. The Worst_Cell is a cell with the worst measurement quantity among cells for which a speech path has been set for a terminal.

CPICH1, CPICH2 and CPICH3 are measurement quantities for each cell (Cell1~3). The measurement quantity is a strength of a signal that a cell transmits, which can be used as a reference to measure speech quality. As illustrated in FIGS. 3 and 4, at the early stage of establishing the speech path, the RNC transmits certain parameters (reporting range, hysteresis and time trigger (T)) to the mobile station to determine a handover of the mobile station. When the mobile station approaches a new cell region (Cell 2), the mobile station performs a suitable event, that is, a handover, with reference to the measurement quantity of each cell and the received parameter values. For example, if the mobile station is connected to a cell 1 and performs a call communication, when the cell 2 satisfies a cell addition event condition (an event A), the mobile station connects a speech path both to the cell 1 and cell 2. Thereafter, while the mobile station is communicating through cell 1 and cell 2, if cell 3 satisfies a cell replacement event condition (an event B), the mobile station disconnects the speech path connected to cell 1 and sets up a speech path to cell 3. Thus, the speech path of the mobile station is set up to cell 2 and cell 3.

Conditions of each event for the above operations are as follows.

1) A condition of the event 'A' measured MQ>MQ of Best_cell−(reporting range−hysteresis)

(MQ is a measurement quantity and the Best_cell is a cell with the highest MQ among cells connected to a speech path)

If a difference between the measured measurement quantity and the measurement quantity of the Best_cell is smaller than '[reporting range−hysteresis]' for a pre-set time (T), the mobile station determines addition of a corresponding cell.

That is, while the mobile station is being connected to cell 1 for a call, when it approaches a new cell (i.e., cell 2), the mobile station compares the measurement quantity of the new cell (i.e., cell 2) to a measurement quantity of the Best_cell (i.e., cell 1). If the comparison value (the difference value) is smaller than '[reporting range−hysteresis]' for the pre-set time (T) the mobile station sets up a speech path to the new cell (i.e., cell 2). Accordingly, the speech path is set up for the mobile station with the two cells (i.e., cell 1 and cell 2).

2) Condition of Event 'B': Measured MQ>MQ of the Worst Cell−Hysteresis (the Worst_cell: a cell with the lowest MQ among cells connected to the speech path).

If a difference between the measured measurement quantity and the measurement quantity of the Worst_cell is greater than the hysteresis for the pre-set time (T), the mobile station deletes the Worst_cell and adds the corresponding cell.

In other words, when the mobile station which has been communicating through exemplary cell 1 and exemplary cell 2 approaches a new cell region (i.e., cell 3), the mobile station compares the measurement quantity of the new cell (i.e., cell 3) and the measurement quantity of the Worst_cell (i.e., cell 1). If the comparison result is greater than hysteresis for the pre-set time (T), the mobile station releases the speech path with exemplary cell 1 and sets up a speech path with exemplary cell 3. Accordingly, the speech path is set up for the mobile station with the two cells (i.e., cell 2 and cell 3).

3) Condition of Event 'C': Measured MQ<MQ of the Best_cell−(Reporting Range-Hysteresis)

If a difference between the measured measurement quantity and the measurement quantity of the Best_cell is greater than '[reporting range+hysteresis]' for the pre-set time (T), the mobile station deletes the corresponding cell.

That is, while the mobile station is being communicated through exemplary cell 1 and exemplary cell 2, when it becomes distant from exemplary cell 3's region, the mobile station compares the measurement quantity of exemplary cell 3 and the measurement quantity of the Best_cell (i.e., cell 2).

If the comparison value is greater than '[reporting range+hysteresis]' for the pre-set time (T), the mobile station releases the speech path with exemplary cell 3 and maintains only the speech path connected to exemplary cell 1.

As mentioned above, the handover determining method uses the measurement quantity of the Best_cell and the measurement quantity of the Worst_cell as reference values for determining a handover. However, the reference values are sensitive to a radio environment, failing to guarantee the speech quality, and since the report range is a range value on the basis of the measurement quantity of the Best_cell, it may not always be suitable as a handover determining parameter. Besides, applying one hysteresis to every event (i.e., cell addition, cell deletion and cell replacement) occurrence condition may also be a problem. As a result, problems arise in that a cell with a bad speech quality can be added by satisfying the cell addition condition or a cell with a bad speech quality may not be deleted as it does not satisfy the cell deletion condition. If an operator sets the hysteresis higher than the report range, a success rate of the handover is degraded and the speech quality is deteriorated.

FIG. 9 is an exemplary flow chart of a handover. A handover may include the following steps. A step (S1) of transmitting a certain parameter from a RNC to a terminal. A step (S2) of measuring a measurement quantity of an adjacent cell. A step (S3) of comparing the measured measurement quantity and a transmitted worst absolute threshold parameter. A step (S5) of checking whether the measured measurement quantity is smaller than the transmitted worst absolute threshold parameter. A step (S9) of calculating an event condition and performing a handover if the measured measurement quantity is greater than the transmitted worst absolute threshold parameter. The step (S5) of checking a measurement quantity. This step may include deleting a measured cell if the measured cell is one of a plurality of cells for which a speech path to the terminal has been set up but is not a Best_cell. This step may also include not adding the measured cell regardless of an event condition if a speech path has not been set up for the measured cell with the terminal.

FIG. 8 is an exemplary handover parameter table of an SIB message. A handover parameter of an SIB message may include the following. The worst absolute threshold, the lowermost reference value guaranteeing a speech quality. A hysteresis 1A, a correction value for adding a cell. A hysteresis 1B, a correction value for deleting a cell. A hysteresis 1C, a correction value for replacing a cell. A T1, a time interval (Δ) between a cell addition/replacement event occurrence time and its report time. A T2, a time interval (Δ) between a cell deletion event occurrence time and its report time.

The worst absolute threshold (or T_drop) parameter, which is added to prevent a situation that a terminal is connected to a cell with a bad speech quality by a speech path, may be determined arbitrarily through experimentation. The hysteresis (1A, 1B, 1C) parameter values may also be determined through experimentation. The parameter (T1) is a time interval (Δ) between a cell addition/replacement event occurrence time and its report time. For rapid handover determination, the time interval (Δ) is set comparatively short. The parameter (T2) is a time interval (Δ) between a cell deletion event occurrence time and its report time. Usually, since the cell deletion occurs when a terminal comes to a cell center from a cell boundary area, the parameter (T2) is set greater than the time interval (Δ) of T1 (ΔT1<ΔT2).

Figure 6A:
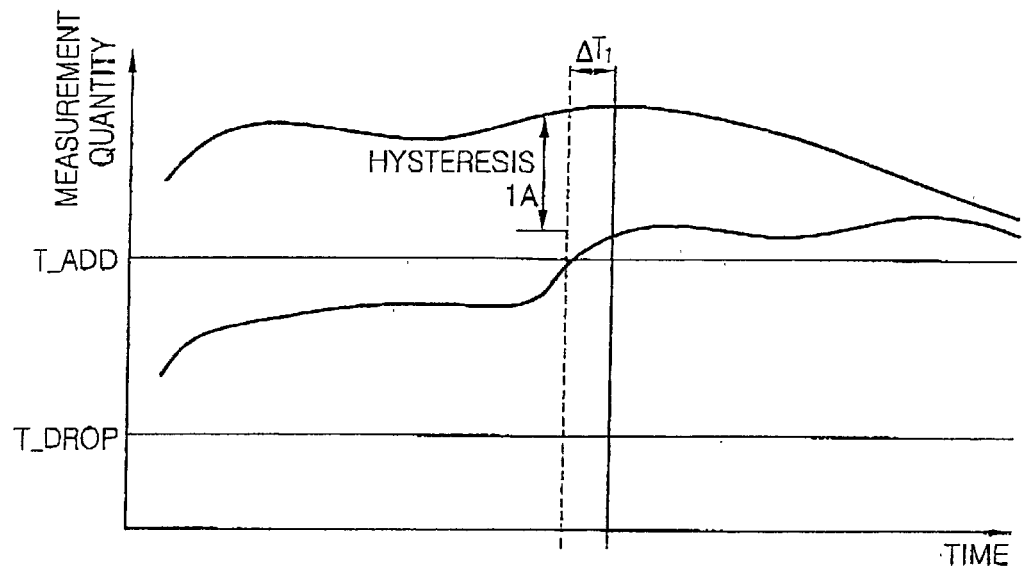
FIGS. 6A and 6B are exemplary graphs illustrating a case that a measured MQ is smaller than the worst absolute threshold.
Figure 6B:
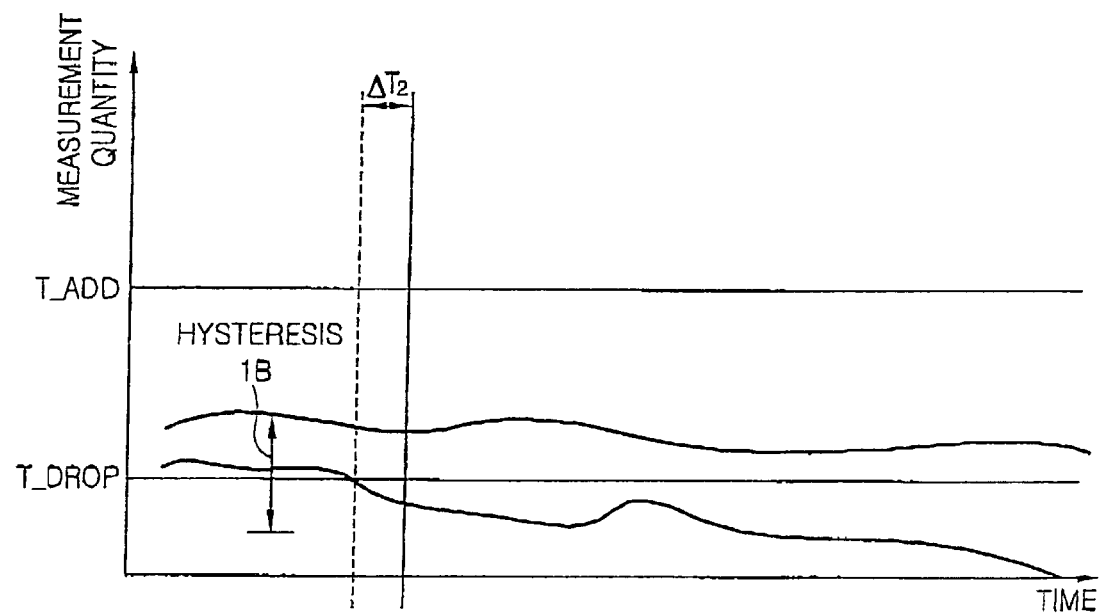

FIGS. 6A and 6B are exemplary graphs illustrating a measured MQ less than the worst absolute threshold. FIG. 6A illustrates a corresponding cell that is not added since a measured measurement quantity is lower than the worst absolute threshold though satisfying the cell addition condition. In this exemplary illustration, embodiments of the present invention solves a problem of a cell addition performed only if the report range is satisfied without considering a speech quality of a measured cell, by using the worst absolute threshold (or T_drop) parameter.

FIG. 6B illustrates a corresponding cell that is deleted because a measured measurement quantity is lower than the worst absolute threshold though not satisfying the cell deletion condition. In this exemplary illustration, embodiments of the present invention solves a problem of resource efficiency of a system being deteriorated as a cell with a bad measurement quantity is not deleted, by using the worst absolute threshold (or T_drop) parameter. If the measurement quantity of the cell to which a speech path is set up with the terminal is below a threshold value (T_drop) for a pre-set time (T2), the corresponding cell is deleted regardless of the cell deletion condition. The pre-set time (T2) is a time difference (D) between a cell deletion event occurrence and its reporting.

Figure 7:
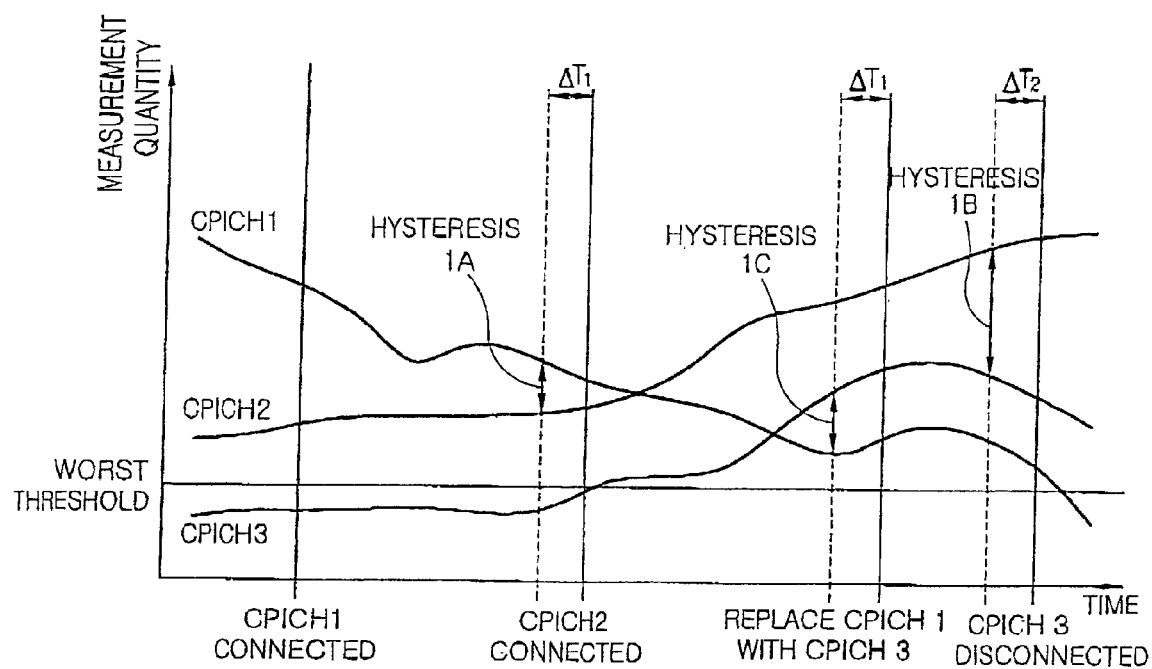
FIG. 7 is an exemplary graph of an event condition.

FIG. 7 is an exemplary graph of an event condition illustrating a determining method of a cell addition, a cell deletion and a cell replacement. In this example, the measurement quantity of a cell, to which a speech path has been set or has not been set with a terminal, is normal. In other words, the measurement quantity is above the threshold value (T_drop).

1) Condition of Event 'A': Measured MQ>MQ of the Best Cell−Hysteresis 1A

If the condition 'A' is satisfied for the pre-set time (T1), a mobile station adds a cell. The hysteresis 1A is a correction value for cell addition. For example, if a difference between the measured measurement quantity and the Best_cell is maintained smaller than the hysteresis 1A for the pre-set time (T1), the mobile station determines addition of a corresponding cell. With reference to the exemplary illustration of FIG. 6A, if the measured measurement quantity is smaller than the worst absolute threshold, the mobile station does not add a corresponding cell regardless of the condition. The event 'A' of FIG. 3 illustrates an exemplary speech path set-up state between the mobile station and cells.

2) Condition of Event 'B': MQ of a Measured cell<MQ of the Best Cell−Hysteresis 1B If the condition is satisfied for the pre-set time (T2), the mobile station deletes the cell. The hysteresis 1B is a correction value for cell deletion. For example, in FIG. 7, in case that a measured cell is one of a plurality of cells to which a speech path has been set up with a terminal, if a difference between a measurement quantity of the measured cell and a measurement quantity of the Best_cell is maintained greater than the hysteresis 1B for the pre-set time (T2), the mobile station determines deletion of the corresponding cell. As shown in the exemplary illustration of FIG. 6B, if the measured measurement quantity is smaller than the worst absolute threshold, the mobile station deletes the corresponding cell regardless of the condition. Exemplary event 'B' of FIG. 3 shows a speech path set-up state between the mobile station and cells according to the determination of the cell deletion.

3) Condition of Event 'C': Measured MQ>MQ of the Worst Cell−Hysteresis 1C (Worst_cell: a cell with the lowest MQ among cells to which a speech path is connected) If the above condition is satisfied for the pre-set time (T1), the mobile station deletes the Worst_cell and adds a corresponding cell. The hysteresis 1C is a correction value for a cell replacement. For example, if a difference between the measurement quantity measured in FIG. 7 and the measurement quantity of the Worst_cell is maintained smaller than the hysteresis 1C for the pre-set time (T1), the mobile station deletes the lowermost cell and adds the corresponding cell. The exemplary event 'C' of FIG. 3 shows a speech path set-up state between the mobile station and cells according to the determining of a cell replacement.

Embodiments of the present invention relate to a handover determining method. The method may include the following steps. Transmitting a certain parameter from a radio network controller (RNC) to a terminal. Measuring a measurement quantity of an adjacent cell. Determining addition/deletion/replacement of the adjacent cell using the measured measurement quantity and a transmitted worst absolute threshold parameter.

In some embodiments of the present invention, certain parameters may include the following attributes. The worst absolute threshold, the lowermost reference value for guaranteeing a speech quality. A hysteresis 1A, a correction value for a cell addition. A hysteresis 1B, a correction value for a cell deletion. A hysteresis 1C, a correction value for a cell replacement. A T1, a time interval ($\Delta$) between a cell addition/replacement event occurrence time and its reporting time. A T2, a time interval ($\Delta$) between a cell deletion event occurrence time and its reporting time.

In embodiments, a cell is added if the measured measurement quantity is greater than the worst absolute threshold for a pre-set time (T1) and satisfies the following conditions. Condition: A measured MQ>MQ of the best cell–hysteresis 1A. (MQ: measurement quantity, the Best_cell: a cell with the highest MQ among cells to which a speech path has been set up). In embodiments, if the measured measurement quantity is smaller than the worst absolute threshold for the pre-set time (T1), a cell may not be added regardless of the above condition.

In embodiments, in case that the measured cell is one of a plurality of cells to which a speech path has been set with a terminal, if a measurement quantity is greater than the worst absolute threshold for a pre-set time (T2) and satisfies the below condition, the measured cell is deleted. Condition: MQ of the measured cell<MQ of the best cell–hysteresis 1B. In some embodiments, if the measured measurement quantity is smaller than the worst absolute threshold for the pre-set time (T2), the corresponding cell is deleted regardless of the above condition.

In embodiments, if the measured measurement quantity is greater than the worst absolute threshold and satisfies the below condition, the worst_cell is deleted and a cell is added. Condition: A measured MQ>MQ of the worst cell–hysteresis 1C; and (Worst_cell: a cell with the lowest MQ among cells to which a speech path has been set up).

Embodiments relate to a handover determining method comprising the following steps. Transmitting a certain parameter from an RNC to a terminal; measuring a measurement quantity of an adjacent cell. Comparing the measured measurement quantity and a transmitted worst absolute threshold parameter. Checking whether the measured measurement quantity is smaller than the transmitted worst absolute threshold parameter. Calculating an event condition and performing a handover if the measured measurement quantity is greater than the transmitted worst absolute threshold parameter.

In some embodiments, the step of checking a measurement quantity comprises the following steps. Deleting a measured cell if the measured cell is one of a plurality of cells to which a speech path has been set up with the terminal but is not the Best_cell. Not adding the measured cell regardless of an event condition if a speech path has not been set up for the measured cell with the terminal.

In some embodiments, the certain parameter comprises the following attributes. The worst absolute threshold, the lowermost reference value for guaranteeing a speech quality. A hysteresis 1A, a correction value for a cell addition; a hysteresis 1B, a correction value for a cell deletion. A hysteresis 1C, a correction value for a cell replacement. A T1, a time interval ($\Delta$) between a cell addition/replacement event occurrence time and its reporting time. A T2, a time interval ($\Delta$) between a cell deletion event occurrence time and its reporting time.

In some embodiments, in the handover performing step, a cell is added when the measured measurement quantity satisfies the below condition for the pre-set time (T1): (Event condition): measured MQ>MQ of the best cell–hysteresis 1A. (MQ: measurement quantity, Best_cell: a cell with the highest MQ among cells to which a speech path has been set up).

In some embodiments, in the handover performing step, a cell is deleted when the measured measurement quantity satisfies the below condition for the pre-set time (T2). (Event condition): measured MQ>MQ of the best cell–hysteresis 1B.

In some embodiments, in the handover performing step, the Worst_cell is deleted when the measured measurement quantity satisfies the below condition for the pre-set time (T1). (Event condition): measured MQ>MQ of the worst cell–hysteresis 1C. (Worst_cell: a cell with the lowest MQ among cells to which a speech path has been set).

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method in a portable device comprising:
   receiving a parameter including a worst absolute threshold parameter corresponding to a lowermost reference value for guaranteeing a speech quality, a first hysteresis correction value used for determining cell addition, a second hysteresis correction value used for determining cell deletion, and a third hysteresis correction value used for determining cell replacement;
   monitoring signal strength of a first signal received from a first base station;
   monitoring signal strength of a second signal received from a second base station;
   utilizing the first signal; and
   utilizing the second signal if the signal strength of the second signal is greater than the worst absolute threshold parameter,
   wherein information embodied in the first signal and information embodied in the second signal are substantially the same, and
   wherein the signal strength of the first signal is greater than the signal strength of the second signal.

2. The method of claim 1, wherein at least one of a mobile device, a mobile terminal, a personal digital assistant, or a cellular phone performs the method.

3. The method of claim 2, further comprising:
   transmitting a third signal to the first base station; and
   transmitting a fourth signal to the second base station, if the utilizing the second signal is performed.

4. The method of claim 1, wherein at least one of the first signal and the second signal are radio signals.

5. The method of claim 1, wherein:
utilizing the first signal comprises outputting the information embodied in the first signal on at least one of a mobile device, a personal digital assistant, or a cellular phone; and
utilizing the second signal comprises outputting the information embodied in the second signal on at least one of the mobile device, the personal digital assistant, or the cellular phone.

6. The method of claim 5, wherein the outputting the information embodied in the first signal and the outputting the information embodied in the second signal are performed simultaneously.

7. The method of claim 1, wherein:
the monitoring the signal strength of the second signal comprises determining if the second signal is at least one of utilized or monitored.

8. The method of claim 1, wherein the information embodied in the first signal is at least one of voice data, internet data, control data, or messaging data.

9. A portable apparatus configured to:
receive a message including a worst absolute threshold parameter corresponding to a lowermost reference value for guaranteeing a speech quality, a first hysteresis correction value used for determining cell addition, a second hysteresis correction value used for determining cell deletion, and a third hysteresis correction value used for determining cell replacement;
monitor signal strength of a first signal received from a first base station;
monitor signal strength of a second signal received from a second base station;
utilize the first signal; and
utilize the second signal if the signal strength of the second signal is greater than the worst absolute threshold parameter,
wherein information embodied in the first signal and information embodied in the second signal are substantially the same, and
wherein the signal strength of the first signal is greater than the signal strength of the second signal.

10. The apparatus of claim 9, wherein the apparatus is at least one of a mobile device, a mobile terminal, a personal digital assistant, or a cellular phone.

11. The apparatus of claim 10, further configured to:
transmit a third signal to the first base station; and
transmit a fourth signal to the second base station, if the second signal is utilized.

12. The apparatus of claim 9, wherein at least one of the first signal and the second signal are radio signals.

13. The apparatus of claim 9, wherein:
utilizing the first signal comprises outputting the information embodied in the first signal on at least one of a mobile device, a personal digital assistant, or a cellular phone; and
utilizing the second signal comprises outputting the information embodied in the second signal on at least one of the mobile device, the personal digital assistant, or the cellular phone.

14. The apparatus of claim 13, wherein the outputting the information embodied in the first signal and the outputting the information embodied in the second signal are performed simultaneously.

15. The apparatus of claim 9, wherein the predetermined level is a transmitted absolute threshold level.

16. The method of claim 15, wherein the transmitted absolute threshold level is at least one of a lowest signal strength for guaranteed signal quality and a lowermost reference value for guaranteeing a speech quality.

17. The method of claim 9, wherein:
the monitoring the signal strength of the second signal comprises determining if the second signal is at least one of utilized and monitored.

18. The apparatus of claim 1, wherein the information embodied in the first signal is at least one of voice data, internet data, control data, or messaging data.

19. A portable apparatus comprising:
a communication device;
means for receiving a message including a worst absolute threshold parameter corresponding to a lowermost reference value for guaranteeing a speech quality, a first hysteresis correction value used for determining cell addition, a second hysteresis correction value used for determining cell deletion, and a third hysteresis correction value used for determining cell replacement; and
means for determining whether to start utilizing received signals, continue utilizing received signals, and discontinue utilizing received signals based on the worst absolute threshold parameter, the first hysteresis correction value, the second hysteresis correction value, and the third hysteresis correction value.

* * * * *